United States Patent [19]

Teytaud

[11] 4,219,249
[45] Aug. 26, 1980

[54] ULTRASONIC WELDING PROCESS FOR AUTOMOBILE ALTERNATOR SLIP RINGS

[75] Inventor: Claude Teytaud, Angers, France

[73] Assignee: Motorola, Inc., Schaumburg, Ill.

[21] Appl. No.: 936,284

[22] Filed: Aug. 23, 1978

[30] Foreign Application Priority Data

Aug. 26, 1977 [FR] France ............................ 77 26121

[51] Int. Cl.³ ...................... H01R 39/08; B23K 19/04
[52] U.S. Cl. ................................. 339/5 R; 228/110;
156/73.2; 29/597; 339/5 P; 339/275 R;
339/277 R; 339/5 M
[58] Field of Search .............. 228/110, 262, 1 R, 1 A,
228/111; 156/73.2, 73.1; 339/5 R, 5 P, 5 M, 5
L, 5 A, 5 RL, 5 S, 6 R, 6 A, 6 RL, 7, 8 R, 8 A,
8 L, 8 P, 8 PB, 8 PS, 8 RL, 9 R, 9 A, 9 E, 9 RY,
275 R, 277 R, 277 C; 29/630 C, 597

[56] References Cited

U.S. PATENT DOCUMENTS

| 2,473,526 | 6/1949 | Hood et al. | 339/5 M |
|---|---|---|---|
| 2,961,385 | 11/1960 | McGall | 339/5 M |
| 3,209,448 | 10/1965 | Jones | 228/110 |
| 3,328,875 | 7/1967 | Pennings | 228/111 |
| 3,398,387 | 8/1968 | Wendell | 29/597 |
| 3,526,554 | 9/1970 | Obeda | 228/110 |
| 3,529,348 | 9/1970 | Kucharski | 29/597 |
| 3,614,726 | 10/1971 | Richter, Jr. et al. | 339/5 M |
| 3,785,049 | 1/1974 | Kanamaru et al. | 339/8 R |

FOREIGN PATENT DOCUMENTS

| 1369388 | 7/1964 | France | 29/597 |
|---|---|---|---|
| 1446162 | 8/1976 | United Kingdom | 228/110 |

Primary Examiner—Daniel C. Crane
Attorney, Agent, or Firm—James W. Gillman; Phillip H. Melamed

[57] ABSTRACT

An ultrasonic welding process is disclosed for the manufacture of alternator slip ring assemblies. An inclined gouging is provided in an exterior slip ring surface, a metallic wire is positioned in the gouging and ultrasonic pressure is applied by an electrode of an ultrasonic generator. The electrode has its working surface parallel to the exterior slip ring surface and therefore inclined with respect to the gouging and wire. This results in a tapered deformation of the wire resulting in a strong ultrasonic bond.

10 Claims, 3 Drawing Figures

ULTRASONIC WELDING PROCESS FOR AUTOMOBILE ALTERNATOR SLIP RINGS

BACKGROUND OF THE INVENTION

The present invention relates to an improved process for welding a metallic conductor wire to a metallic conductor piece, by ultrasonic bonding. More particularly, the present invention relates to the construction of automobile alternator slip rings and the use of an improved ultrasonic welding process to produce a slip ring assembly.

According to one known practice, to make an ultrasonic weld the wire, or a part of the wire (an end or middle section), is placed in contact with one exterior side of the piece to which it will be welded to. Then a working side of an electrode of an ultrasonic generator is placed on the wire under a pressure of defined stress. Then, the wire is subjected to the effect of an ultrasonic vibration coming from the electrode for a defined time. When the electrode is removed, the welded portion of the wire is flat due to the stress and it strongly adheres to the piece.

However, to obtain the above desired result, the wire, during the welding process, has to be held fixed with respect to the piece in order to avoid relative movement between them during the "vibrative oressure" which is generated. In addition, since the welded part of the wire is flat, the wire presents a potentially brittle surface at the junction of the aforesaid flat welded part with its unflat and unwelded part(s).

SUMMARY OF THE INVENTION

An object of the present invention is to assure fixing a wire to an exterior side of a piece during a welding operation which joins the two.

Another object of the present invention is to eliminate potential brittle areas of a bonded wire by an improved ultrasonic welding process.

A more particular object is an improvement to an ultrasonic welding process for bonding a metallic wire on one of the exterior sides of a metallic piece in which the wire to be welded is subjected to the effect of ultrasonic pressure coming from the "electrode" of an ultrasonic generator with the electrode being kept pressed on the wire and in contact with the aforesaid exterior side under a defined pressure.

According to the present invention, before the so-called welding operation, on the exterior piece surface a gouging is formed which is inclined with respect to the stress-side (working surface) of the electrode that is to contact the wire, and the wire to be welded is set in the gouging. The width of the aforesaid gouging is such that the wire, placed in the gouging and subjected to the bearing-pressure of the electrode, is fixed with respect to the surface of the aforesaid piece during the bonding operation.

Still another object of the present invention is to provide a slip ring for alternators for use with the above mentioned process. The slip ring is formed, as already known, by a cylindrical part and by a radial shoulder, this shoulder having—according to the present invention—an opening for a conductor wire, reaching, on an exterior side of the shoulder, the deepest extremity of a hollow gouging in the aforesaid exterior side and inclined with respect to it.

BRIEF DESCRIPTION OF THE DRAWINGS

The present invention will be better understood with reference to the following description, only given as a non-restrictive example, and with reference to the drawings in which.

DESCRIPTION OF THE PREFERRED EMBODIMENTS OF THE INVENTION

Figure 1:
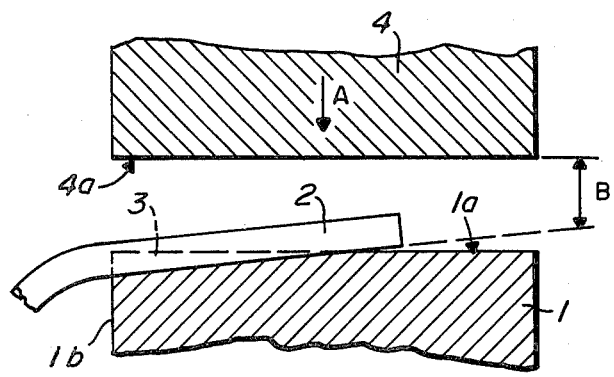
FIG. 1 is a schematic view of the process of the present invention before welding.

Referring to FIG. 1, which is partly shown in cross section, a piece 1 is illustrated having an exterior side 1a on which a wire 2 is intended to be welded by ultrasonic means in order to make an electrical connection. The wire 2 is set in a hollow gouging 3 in the side 1a.

FIG. 1 also schematically illustrates an "electrode" 4 (or sonotrode) of an ultrasonic generator which is not represented. To effect welding, the working-side or stress-side 4a of the electrode 4 is pushed with a defined pressure in direction A, onto the piece 1 and wire 2 assembled unit which rests on a holding support not represented. It should be noted that the gouging 3 is inclined at an angle B with respect to the aforesaid working-side 4a. As usual, the aforesaid side 4a is maintained parallel with side 1a of the piece 1 and the gouging 3 is therefore also inclined at the same angle B with respect to the side 1a and therefore presents a variable depth channel in the surface 1a.

The deepest part of the gouging 3 is illustrated as reaching a side 1b of the piece 1 that corresponds to an edge or opening. The present invention also contemplates a hollow gouging in the center of the surface 1a which does not terminate at an edge, but, for example, has a nearly toroidal variable depth groove shape.

Also the present invention contemplates having the gouging 3 as an ordinary slot of uniform depth made on the side 1a and, in this case, piece 1a is, by means of an appropriate holding support, kept inclined so that the gouging is at an angle B with respect to the side 4a of the electrode.

When the electrode is moved into contact with the wire 2 and piece 1, the electrode 4 produces ultrasonic waves for a defined time. After the welding is completed, the "piece 1—wire 2" unit is as illustrated schematically on FIG. 2. In this figure, the wire is illustrated as being flattened due to the effect of the ultrasonic pressure and it is noted that the wire strongly adheres to the piece 1 near the surface 1a and in the gouging 3. This good adherence is, at least partly, caused by the wire 2 remaining fixed with respect to the piece 1 during all of the welding operation. This is because it is impossible for the wire to roll on itself because it is held in place by the gouging 3 whose width was dimensioned with respect to the wire diameter to obtain such a result.

Figure 2:
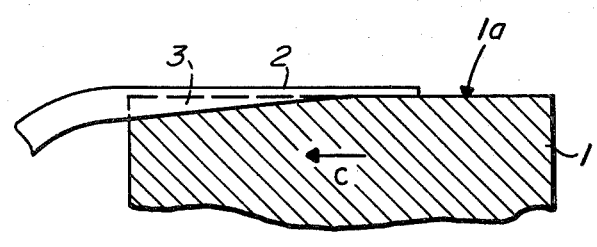
FIG. 2 is a view similar to FIG. 1, but after welding.

It should also be noted that according to the present invention, an adherence of the wire 2 on the piece 1 is created which decreases in a direction C in FIG. 2. In fact, the vibrating pressure generating the welding was applied longer at the end of the wire 2 extending on the side 1a than at the part of the wire laying in the portion of larger depth of the gouging 3. This is because the side 4a of the electrode 4 gradually comes into contact with the wire because of the gouging inclination and this produces a tapered gradual deformation of the wire. This causes a better holding of the weld against tear-stresses.

Figure 3:
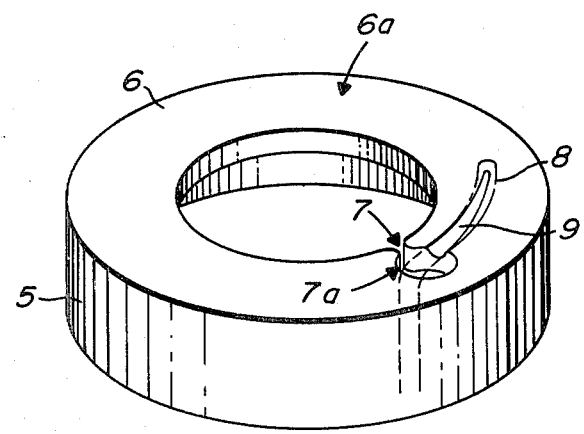
FIG. 3 illustrates, by an exterior perspective view, a slip ring constructed according to the present invention.

FIG. 3 illustrates an alternator slip ring with a cylindrical part 5 which forms the friction surface for appropriate brushes (which are not represented) and a radial shoulder 6. This shoulder has an opening 7 going through it for a wire run 8 (shown in phantom) to be connected electrically to the slip ring. The opening 7 appears on an exterior side 6a of the shoulder 6 at the deepest extremity of a hollow gouging 9 on the side 6a, and inclined with respect to it. The wire 8 at the opening end 7 is placed in the gouging 9 and, as in FIGS. 1 and 2, the electrode of an ultrasonic generator is placed on the "wire-slip ring" unit. A weld formed thusly has the same characteristics and advantages as those above mentioned. In addition, an edge 7a of the opening 7 opposed to the gouging 8 forms a stop for any eventual backward-movement of the wire 8 during the welding operation. The gouging 9, as shown in FIG. 3, has a tapered construction such that at its deepest portion it has a width at least equal to the diameter of the wire 8 and at its shallow portion it has a width less than the diameter of the wire. This aids in fixing the wire with respect to the shoulder surface 6a during bonding.

The present invention obtains a strong and easily accomplished weld between a wire and a piece. It also permits keeping all of the previously known advantages of ultrasonic welding, i.e. that it is not necessary to clean the piece surface or to take off the insulating varnish or enamel coating covering the wire.

The invention has an interesting application in the world of the electrical device construction, especially in manufacturing of automotive alternators.

The present invention is not restricted to the above description but, to the contrary, covers all variants which come within the scope of the attached claims.

I claim:

1. An ultrasonic welding process for bonding a portion of a metallic wire having a longitudinal axis and a diameter to one exterior surface of a metallic piece to produce an electrical bonding of the metallic wire to the metallic piece, comprising the step of subjecting the piece and wire to the effect of an ultrasonic pressure coming from an electrode of an ultrasonic generator wherein a working surface of the electrode is kept pressed on the wire and in contact with the aforesaid exterior side under a defined pressure, the process characterized by the steps of, before applying the ultrasonic pressure, making on the exterior piece surface a gouging inclined with respect to the working surface of the electrode so that the gouging presents a variable depth channel to the electrode working surface, putting a portion of the wire to be welded in the gouging, and applying ultrasonic pressure from the electrode working surface to the portion of the wire inclined with respect to the electrode working surface and positioned in said gouging to produce a gradual axially tapered deformation of the wire while electrically bonding the wire to the metallic piece, whereby a strong bond less susceptible to tear stresses is provided between the wire and metallic piece.

2. An ultrasonic welding process according to claim 1 characterized by making the gouging have a width with respect to the wire diameter such that the wire, when put in the gouging and subjected to the pressure of the electrode, is fixed by said gouging with respect to the aforesaid piece during the application of the ultrasonic pressure, whereby a strong bond less susceptible to tear stresses is provided between the wire and said piece.

3. An ultrasonic welding process according to claims 1 or 2 wherein said exterior piece surface and said electrode working surface are maintained parallel during the application of said ultrasonic pressure.

4. An ultrasonic bonding process according to claim 2 wherein said gouging has a portion having a width less than said wire diameter, and said wire is bonded in said gouging portion.

5. An alternator slip ring assembly comprising a metallic alternator slip ring having a cylindrical part and a radial shoulder, the shoulder having an opening therein for a conductor wire, the opening reaching onto an exterior surface of the shoulder at the deepest extremity of a hollow gouging in the aforesaid exterior surface which is inclined with respect to the exterior shoulder surface so as to provide a variable depth channel with respect to said exterior shoulder surface, and a metallic wire having a longitudinal axis and diameter and a portion ultrasonically bonded in said gouging, said wire portion in said gouging having a gradual axially tapered deformation, whereby a strong bond less susceptible to tear stresses is provided between the wire and slip ring.

6. An alternator slip ring assembly according to claim 5 wherein a stop edge is formed on said shoulder and located opposite to said gouging across said opening, and wherein said gouging has a predetermined width with respect to the diameter of said wire such that said wire is presented from rolling on itself during the ultrasonic bonding of the wire to the slip ring.

7. An alternator slip ring assembly according to claim 6 wherein said gouging has a portion having a width less than said wire diameter, and said wire is bonded in said gouging portion.

8. An ultrasonic welding assembly comprising a piece having an exterior surface with a wire having a diameter and longitudinal axis and ultrasonically bonded thereto, wherein the improvement comprises a gouging in the exterior surface, and portions of the wire being bonded onto the exterior surface and inside said gouging, said wire portion bonded inside said gouging having a gradual axially tapered deformation of the wire.

9. An ultrasonic welding assembly according to claim 8 wherein said exterior surface to which said wire is bonded to is substantially planar and metallic, and wherein said wire is metallic, and wherein said gouging has a predetermined width with respect to said wire diameter such that said wire is prevented from rolling on itself during the ultrasonic bonding of the wire to the piece, and wherein said gouging is inclined with respect to said exterior surface to provide a variable depth channel.

10. An ultrasonic welding assembly according to claim 9 wherein said gouging has a portion having a width less than said wire diameter, and said wire is bonded in said gouging portion.

* * * * *